United States Patent [19]

Cretin et al.

[11] Patent Number: 4,644,506

[45] Date of Patent: Feb. 17, 1987

[54] DEVICE FOR DETERMINING THE POSITION IN THE WATER OF AN ELONGATE ELEMENT TOWED WHILE SUBMERGED

[75] Inventors: Jacques Cretin, Le Chesnay; Jean Rudaz, Noisy sur Ecoles; Pierre Gonzalez, Rueil Malmaison, all of France

[73] Assignees: Institut Francais du Petrole, Rueil-Malmaison; Compagnie Generale de Geophysique, Massy, both of France

[21] Appl. No.: 593,262

[22] Filed: Mar. 26, 1984

[30] Foreign Application Priority Data

Mar. 24, 1983 [FR] France ............................... 83 05020

[51] Int. Cl.$^4$ ............................................. G01V 1/38
[52] U.S. Cl. .......................................... 367/19; 367/77
[58] Field of Search ................... 367/16, 17, 18, 19, 367/77, 76, 78; 340/855, 851; 455/40

[56] References Cited

U.S. PATENT DOCUMENTS

| | | | |
|---|---|---|---|
| 3,886,494 | 5/1975 | Kostelnicek et al. | 367/74 |
| 3,996,553 | 12/1976 | Siems et al. | 367/79 |
| 4,309,763 | 1/1982 | Passmore et al. | 367/77 |
| 4,481,611 | 11/1984 | Burrage | 367/19 |

*Primary Examiner*—Stephen C. Buczinski
*Assistant Examiner*—Ian J. Lobo
*Attorney, Agent, or Firm*—Antonelli, Terry & Wands

[57] ABSTRACT

A device for determining the position in the water of an elongate element (a seismic streamer for example) towed while submerged, by means of measuring elements such as compasses and pressure gauges spaced apart along said elongate element. Said compasses and pressure gauges are disposed inside profiled bodies firmly secured to sleeves fixed about said elongate element and transmit the measurements, by means of a hertzian wave transmission assembly, to a sensor inside the elongate element, which is connected by a transmission cable to a reception assembly connected to a central unit installed in the towing ship.

10 Claims, 5 Drawing Figures

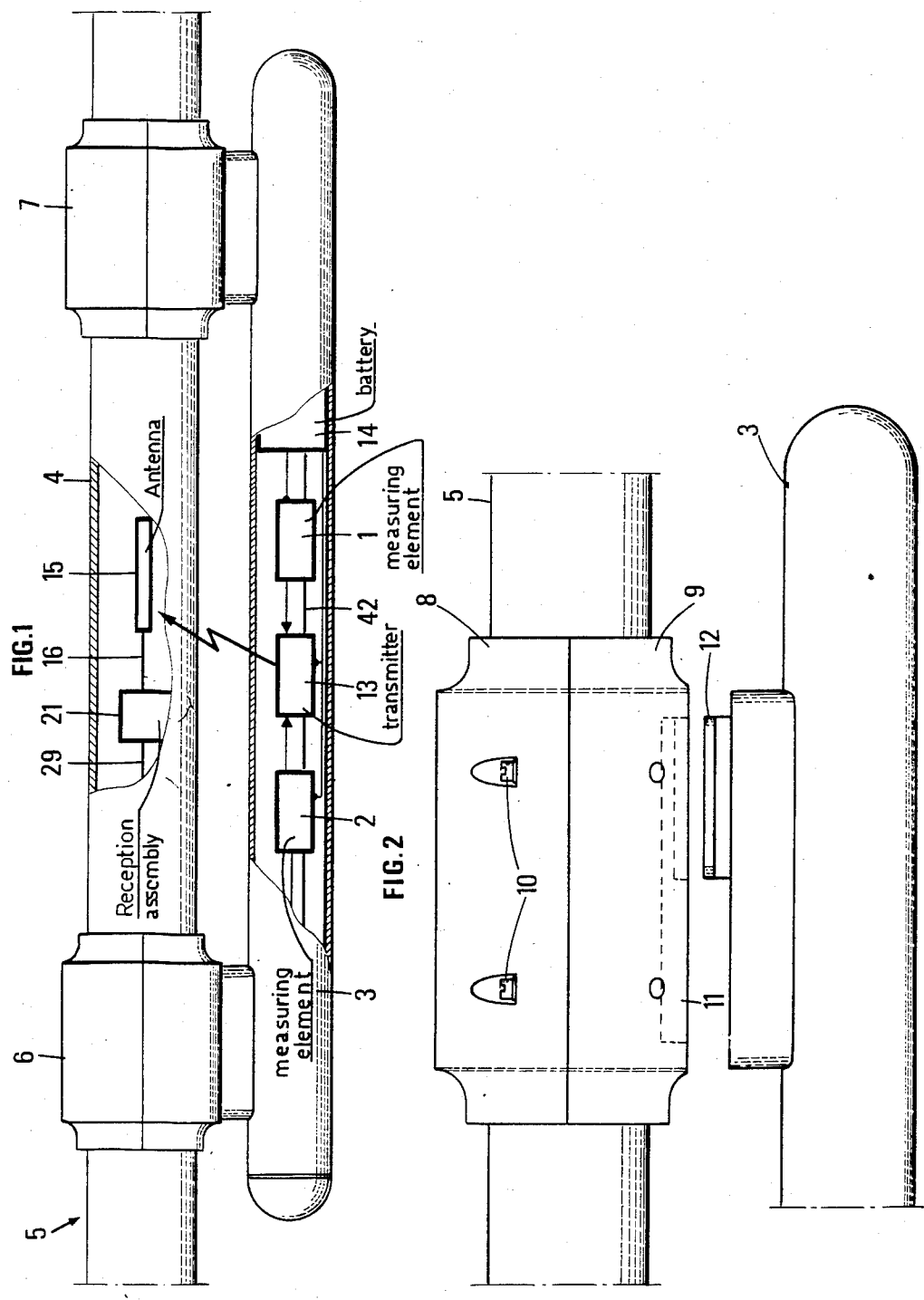

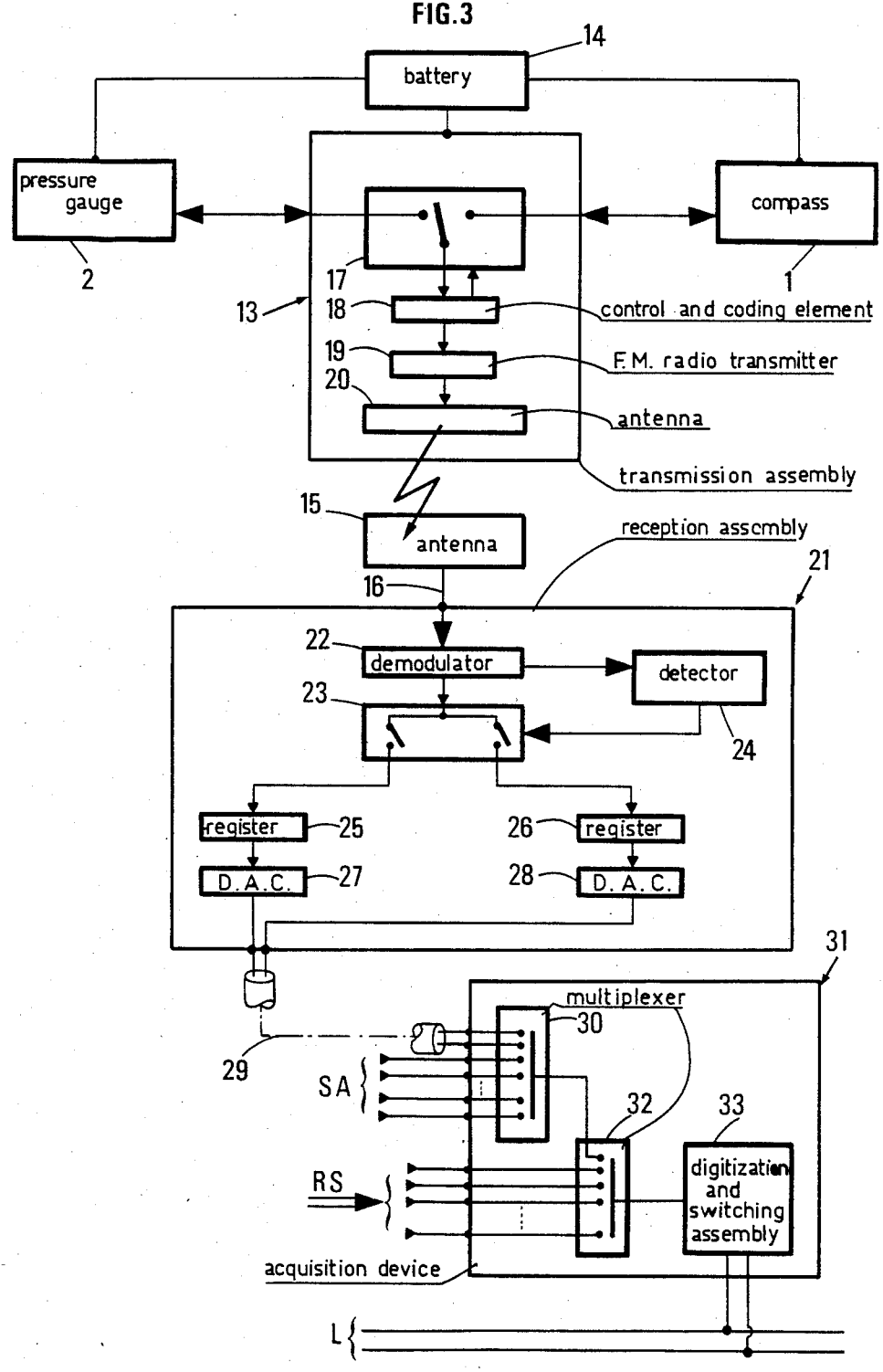

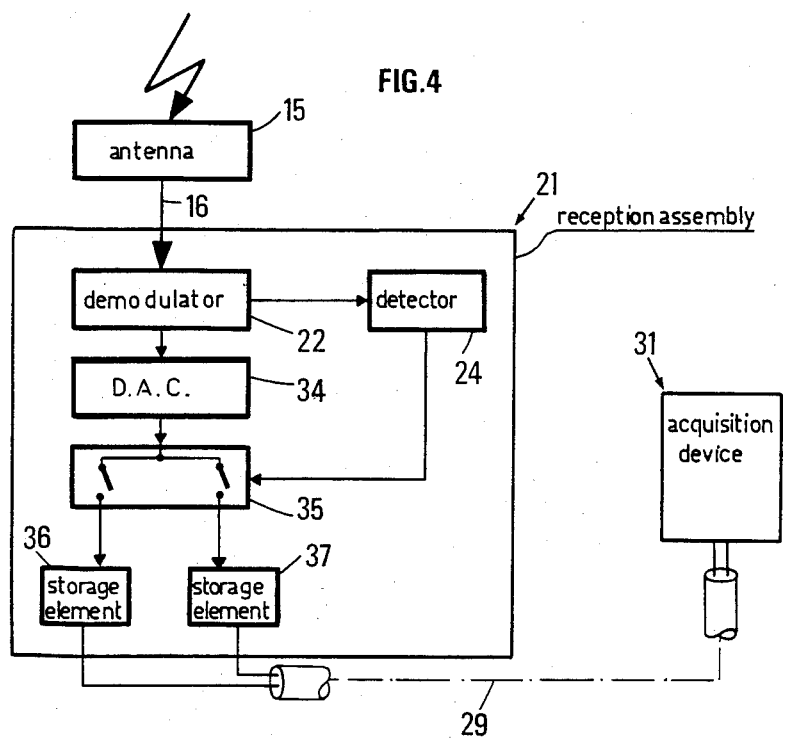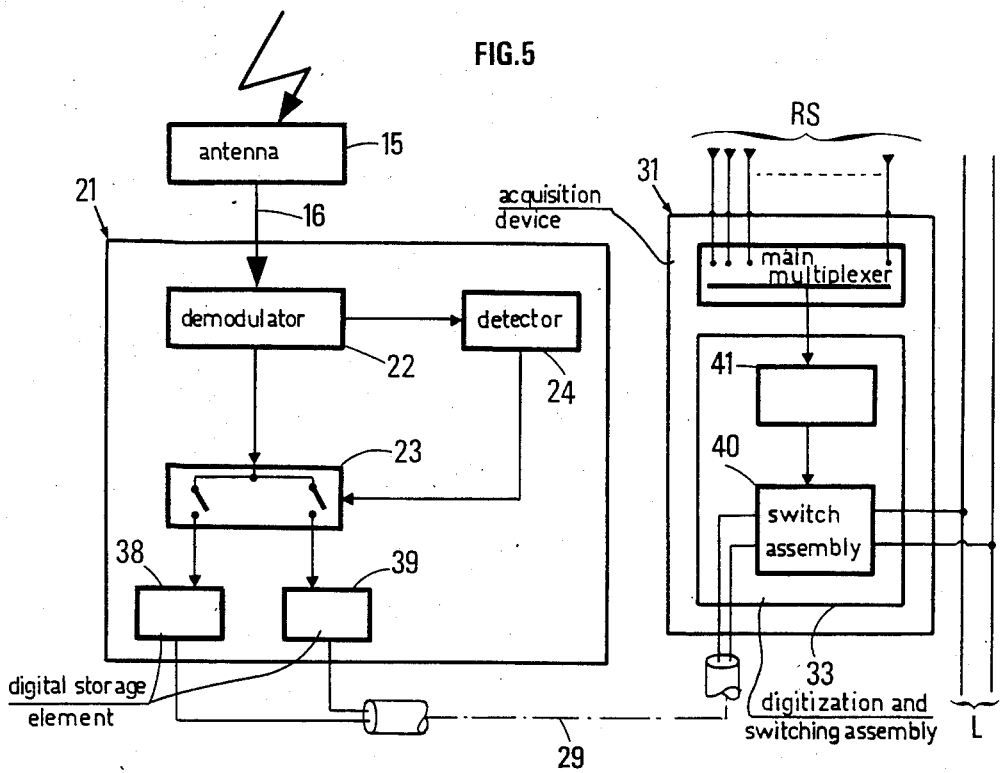

DEVICE FOR DETERMINING THE POSITION IN THE WATER OF AN ELONGATE ELEMENT TOWED WHILE SUBMERGED

BACKGROUND OF THE INVENTION

1. Field of the Invention

The present invention relates to a system for determining the position of an elongate element of great length towed when submerged by a ship which uses a plurality of means for measuring the position in the water of the elongate element, distributed therealong.

More particularly, the invention relates to a system for determining the position of a marine seismic streamer comprising a plurality of means for measuring the direction and depth spaced apart along the whole of the seismic streamer and connection means disposed inside the elongate element for transferring the measurements obtained to a central recording and processing system installed in the ship.

2. Description of the Prior Art

One known method for determining the real position in the water of a seismic streamer formed from a plurality of interconnected sections each containing an array of seismic sensors and transmission lines, consists in incorporating inside the streamer at regular intervals direction measuring elements such as compasses, and elements, for measuring the hydrostatic pressure, such as manometers or pressure gauges, so as to obtain the orientation of the seismic streamer and the depth at which it is immersed at a plurality of locations and, consequently, so as to determine its position behind the towing ship. The measurements made by these elements are transmitted to a central recording and processing system disposed in the ship and recorded at the same time as the seismic signal picked up so that, during processing of the seismic recordings, the possible lateral drift of the seismic streamer with respect to the direction followed by the towing ship may be taken into account or the seismic profile plane corresponding to the recordings may be defined. Such a system for determining the position in the water of a seismic streamer is described for example in French patent No. 2.218.571.

Since the readings given by compasses are falsified by the presence of these compasses in the vicinity of magnetic masses, they are preferably disposed in positions remote from the metal parts of the connections joining together the ends of the different sections of the seismic streamer. In a first arrangement, the compasses are disposed in the central part of each streamer section and are connected to a conducting line. The case of each compass is held in position for example by the outer sheath of the streamer into which it is inserted at the time of its installation, but when this outer sheath is inflated so as to counterbalance the hydrostatic pressure at the depth where it is to operate and when the diameter of the sheath increases, for this reason, the initial position of the compass may be modified in an unpredictable way, which creates an uncertainty as to the true direction of the streamer section measured by the compass.

The arrangement of the measuring elements inside the streamer sections presents other disadvantages. Accessibility thereto is difficult and if, during use, operation thereof proves defective, it is necessary to completely change the corresponding streamer section.

Furthermore, in the case where the measuring elements comprise pressure gauges, their arrangement inside the sheath makes the preliminary operations for testing correct operation more difficult. It must also be emphasised that, since the sections of the seismic streamer must be interchangeable, it is necessary to incorporate measuring elements inside each of them, which appreciably increases their cost, particularly when these elements comprise a compass.

According to a second arrangement, the compasses and other measuring elements are incorporated in streamer sections or rigid cases inserted between the streamer sections. Each case is made from a non-magnetic material and its length is chosen to be fairly large so as to avoid the disturbances caused to the compasses by the metal parts of the connections between the streamer sections. Positioning of the compasses is in this case more accurate and the direction of the axis of the case is in this case known with greater accuracy. In addition, maintenance may be more readily carried out by replacing a section which proves to be defective. However, arrangement also has drawbacks. The other measuring elements, such as the pressure gauges, remain inaccessible for direct testing carried out at the time of use. Such a streamer section or case may be inserted when it is required but, if the number of sections or cases added is large, the total length of the streamer is increased very substantially and the modifications which result therefrom in the distribution of the sensors all along the streamer lead to a change in the seismic recordings obtained.

In another arrangement, measuring instruments such as depth sensors, are fixed to the outside of the flute, at evenly spaced intervals all along the length thereof and are associated respectively with inductive coupling transmission means for exchanging control and measurement signals with a transmission line inside the streamer, these means comprising transformers whose windings are disposed on each side of the outer sheath of the streamer. However, this presents a problem in that the induction connections require good magnetic coupling between the windings and, consequently, accurate positioning thereof with respect to each other is necessary.

The device of the invention overcomes the above mentioned disadvantages.

SUMMARY OF THE INVENTION

The device of the invention comprises a plurality of means for measuring the position in the water of the elongate element spaced apart along and on the outside of the elongate element and connection means disposed inside the elongate element for transferring the measurements obtained to a central data recording and processing system disposed in the ship. It is characterized in that the measuring means are associated respectively with assemblies for transmitting the signals supplied by the measuring means to the connection means inside the elongate element, in the form of radio waves modulated by said signals.

In the case where the elongate element is a seismic streamer of the digital type, it may comprise a number of acquisition devices each adapted to collect, by multiplexing, the signals received by a plurality of seismic sensors or of groups of seismic sensors disposed inside the flute, to digitize them and to transmit them sequentially to the central recording and processing system over one or more lines, the internal connection means comprising lines for transmitting the data supplied by the external measuring means to the acquisition devices.

Such an arrangement is advantageous in that the measuring elements are always accessible, which facilitates adjustment and calibration thereof, in particular when it is a question of compasses and pressure gauges. The reception means of the transmission assembly may be systematically incorporated in all the seismic streamer sections whereas the measuring elements, generally much more costly, may be fixed, associated with their particular transmission means, to a greater or lesser number of sections depending on requirements. Addition thereof causes no modification to the total length of the seismic flute, because they are installed on the outside thereof.

Furthermore, the use of transmission by radio waves modulated by the signals to be transmitted offers a certain latitude in the relative positioning of the corresponding transmitting and receiving parts of the different transmission assemblies, which facilitates adaptation thereof to the streamer. It also provides high reliability and high accuracy in the transfer to the central system of the measurements obtained especially if the data collected is digitized and coded.

The addition of the device to a streamer is even easier when the streamer is of the digital type, the measurement signals then being transmitted, by means of local transmission lines, to the acquisition devices of the general system for transmitting the seismic signals.

BRIEF DESCRIPTION OF THE DRAWINGS

Other features and advantages of the device will appear from the following description of particular and non limiting embodiments with reference to the accompanying drawings in which:

FIG. 1 shows the arrangement of a profiled body containing the measuring means on the outside of a seismic streamer;

FIG. 2 shows in greater detail the sleeves surrounding the seismic streamer, to which the profiled body is firmly secured;

FIG. 3 shows schematically a transmission and reception system associated with the measuring means in accordance with a first embodiment of the present invention;

FIG. 4 shows schematically a receiver inside the seismic streamer associated with the measuring means in accordance with a second embodiment; and FIG. 5 shows schematically a receiver inside the seismic streamer associated with the measuring means in accordance wtih a third embodiment.

DESCRIPTION OF THE PREFERRED EMBODIMENTS

Referring to FIG. 1, it can be seen that the measuring elements formed for example by a compass 1 and a pressure gauge 2 are disposed inside a hollow profiled body 3 firmly secured to the outer sheath 4 of a seismic streamsection 5 by fixing means. These fixing means comprise two sleeves 6, 7 each formed (FIG. 2) from two shells 8, 9 disposed on each side of the seismic streamer5 and joined together by fixing screws 10, these sleeves being provided with a longitudinal recess 11 in which a tenon 12 integral with the profiled hollow body 3 is fitted. The two sleeves 6, 7 may comprise an outer ring adapted for free rotation with respect to the seismic streamer so that the axis of the hollow body remains in a vertical plane whatever the rotational movements of the streamabout its longitudinal axis.

Inside body 3 is fitted a support element 42 to which the measuring elements and a radio transmitter 13 for transmitting the signals generated by the measuring elements 1, 2 are fixed. A power supply 14 also fixed to the support element 42 is used for supplying the measuring elements and the radio transmitter with electric power. An antenna 15 is disposed inside the seismic streamer section in the vicinity of the position of the profiled body 3 for receiving the signals transmitted by the radio transmitters 13. The signals received by antenna 15 are transmitted by a connection 16 to a neighboring receiver 21.

Transmitter 13 comprises, for example (FIG. 3) a switch 17 whose terminals are connected respectively to the compass 1 and to the pressure gauge 2 and whose common terminal is connected to a control and coding element 18. This element 18 is adapted for controlling switch 17 so as to receive alternately the signals generated by one or the other of the measuring elements 1 and 2, to encode the signals which is receives according to a particular code which is chosen for the transmission and to assign an identification number thereto.

Measuring elements are used which are preferably of the digital type able to supply the values which they measure in the form of a sequence of coded pulses. An angular value of n degrees may be represented, for example, by a series of n successive pulses or else a signal representative of the binary expression of this value.

Coding consists in this case in expressing the digital signal delivered by each measuring element according to the BCD, ASCII, Gray code or any other code well known by specialists. The identification number is for example a particular prefix preceding each digital word to indicate the source of the signal data.

Each coded signal is then transmitted to signal modulator 19 associated with a transmission antenna 20. The carrier frequency of the radio signal transmitted is chosen to be very low (of the order of 20 kHz for example). It is modulated in response to the successive pulses forming the digitized signals to be transmitted. Modulation consists, for example, in varying the transmission frequency between two predetermined values $f_1$ and $f_2$.

The receiver 21 connected to antenna 15 by connection 16 (FIG. 1) comprises a demodulator 22 for transforming the frequency variations of the received signal into pulsed signals. These signals are transmitted on the one hand to the common input of a switch 23 and, on the other, to a decoder 24 which detects in each coded sequence of transmitted pulses the identification number of the measuring element and generates a signal for controlling the switch 23. Depending on whether the sequence of pulses received relates to compass 1 or to pressure gauge 2, it is directed towards and stored in a register 25 or a register 26. The outputs of these two registers are connected respectively to the inputs of two digital-analog convertors 27, 28. The method of transmitting the analog voltages delivered by convertors 27, 28 depends on the type of seismic streamer used.

The device may be associated for example with a seismic streamer of the digital type comprising a plurality of acquisition devices 31 each adapted to connect the signals RS received by a plurality of sensors or of groups of sensors, to digitize them and to transmit them sequentially to the recording system on one or more lines, these acquisition devices 31 being disposed inside rigid cases inserted between the flute sections. Such a case is described for example in U.S. Pat. No. 4,398,271.

In the example shown in FIG. 3, the reception assembly is connected by a cable 29 to two inputs of an auxiliary multiplexer 30 included in an acquisition device 31 disposed at one of the ends of the streamer section, the other inputs of this multiplexor 30 receiving other analog signals SA from other receivers which are also to be transmitted to the central control and recording system. The output terminal of the auxiliary multiplexer is connected to one of the inputs of a main multiplexer 32, the other inputs thereof receiving the analog signals RA delivered by the seismic receivers. The output of multiplexer 32 is connected to the input of a digitization and switching assembly 33 communicating intermittently with the central recording system through one or more lines L.

In the variant of the reception assembly shown in FIG. 4, the output of demodulator 22 is connected directly to the input of a single digital-analog converter 34. The analog signals from this converter 34 are directed by a switch 35 actuated by the identification element 24 to the input of a first or a second analog storage element 36, 37 depending on whether the decoded identification number corresponds to an orientation measurement made by the compass 1 or a depth measurement from the pressure gauge 2. Similarly, the outputs of the analog storage elements 36, 37 are connected to the local acquisition device 31 by a cable 29.

The analog signals available at the outputs of convertors 27, 28 or 34 (embodiments of FIGS. 3 and 4) are reconverted into digital signals by the local acquisition device 31 and transmitted to the central recording system of the boat in accordance with the digitization code chosen for the digital streamer with which the device of the invention is associated. Thus, the synchronization difficulties which appear when two different digitization codes have to be matched to one another are avoided.

The embodiment of FIG. 5 corresponds to the case where coding of the signals by the coding element 18 (FIG. 3) is carried out directly in accordance with the code used for transmitting the digitized seismic signals over the transmission lines from the different acquisition devices 31 inserted along the whole length of the seismic streamer and where the digital-analog conversion of the measurement signals generated by the compass 1 or the pressure gauge 2 is not required. In this case, the output of demodulator 22 is connected through switch 23, controlled by the decoder 24, to the input of a first or a second digital storage element (register) 38, 39, depending on whether the decoded identification number is that assigned to the compass 1 or to the pressure gauge 2. The outputs of these two storage elements 38, 39 are connected directly to two inputs of switch 40 of the digitization and switching assembly 33, the seismic receivers RS being connected to other inputs of the sub-assembly through the main multiplexer 32 and A/D converter 41.

The device may also be associated with a seismic streamer of the analog type in which the analog signals generated by the different sensors or groups of sensors spaced apart over the whole of its length are transmitted to the recording system installed in the towing ship, by means of a transmission line array. In this case, the outputs of the two converters 27, 28 (FIG. 3) of each reception assembly 21 are connected through switching means (not shown), controlled by the recording system, to a particular line of this array.

Since the deformations of the moving seismic streamer and consequently the variations of the measurements made by the measuring elements are relatively slow, the timelapse between two successive interrogations of each compass 1 or each pressure gauge 2 (FIG. 3) obtained by switching of switch 17 under the control of the control and coding element 18, may be chosen to be relatively long (one or more seconds).

Still within the scope and spirit of the invention, measuring elements of the analog type and analog-digital conversion means may be used for transforming the measured values into digital words or acoustic transmission and reception means may be used for transmitting to the inside of the seismic streamer the results of the direction and depth measurements.

What is claimed is:

1. A device for determining the position of an elongate element of great length, such as a seismic streamer, towed by a ship, comprising: a plurality of housings spaced apart along the elongate member and disposed outside thereof; means in each of said housings for measuring the position of the elongate member and for producing position signals indicative of said position; radio transmitting means in each of said housings for transmitting radio waves modulated by said position signals; radio receiving means in said elongate member for reception of radio wave propagated through water from said transmitting means; and connecting means for transferring position data received by said radio receiving means to a central data recording and processing system.

2. A device for determining the position of a seismic streamer of the digital type towed when submerged by a ship, said digital seismic streamer including a plurality of acquisition devices each having means for digitizing the signals received by a plurality of seismic sensors disposed inside the streamer and multiplexing means for transmitting the digitized signals sequentially to a central recording and processing system over one or more lines, said position determining device comprising: a plurality of housings spaced apart along the elongate member and disposed outside thereof; means in each of said housings for measuring the position of the elongate member and for producing position signals indicative of said position; radio transmitting means in each of said housings for transmitting radio waves modulated by said position signals; radio receiving means in said elongate member for receiving radio waves propagated through water from said transmitting means; and connecting means including line means for transferring position data indicated by the signals received by said radio receiving means to an acquisition device, from which said received position data is transmitted to said central data recording and processing system in addition to said seismic data.

3. The device as claimed in claim 2, wherein said line means is connected to an acquisition device through further multiplexing means.

4. The device as claimed in claim 1, wherein said measuring means in each housing comprises measuring apparatus, the transmitting means comprises encoding means for coding the values measured by the measuring apparatus in the form of digital signals, first switch means for successively connecting to the input of said encoding means the signals generated by said respective measuring apparatus, said radio transmission means comprises a frequency modulation radio transmitter connected to receive the output of said encoding means.

5. The device as claimed in claim 4, wherein said measuring apparatus comprise a compass and a pressure gauge.

6. A device as claimed in claim 4, wherein said radio receiving means includes means for demodulating the signals received from said transmitting means, storage means for storing said demodulated signals in a respective storage location for each measuring apparatus and second switching means connected to said demodulating means and said storage means for applying said demodulated signals to said respective storage locations of said storage means.

7. The device as claimed in claim 6, wherein said storage means comprises two digital registers connected respectively to the outputs of said second switch means, and further comprising conversion means including two digital-analog convertors connected respectively to the outputs of said two registers for converting the contents of said two digital registers to respective analog signals.

8. The device as claimed in claim 6, further including conversion means including a digital-analog converter for transforming said demodulated signals into analog signals, and wherein said storage means comprise two analog storage elements connected to outputs of said second switch means, the input thereof being connected to the output of said digital-analog converter.

9. The device as claimed in claim 6, wherein output terminals of said second switch means are connected to digital storage elements.

10. The device as claimed in claim 1, wherein said housings comprise profiled bodies, and including means for supporting said profiled bodies on said elongate element so that said profiled bodies are always held in a position below said elongate body.

* * * * *